United States Patent [19]

Asano et al.

[11] Patent Number: 4,991,479

[45] Date of Patent: Feb. 12, 1991

[54] APPARATUS FOR TRIMMING ARTICLES MOLDINGLY FORMED ON THERMOPLASTIC SHEET AND PROCESS FOR OPERATING THEREOF

[75] Inventors: Kazuo Asano; Toshihiro Takai; Masayasu Kinoshita, all of Nagoya, Japan

[73] Assignee: Kabushiki Kaisha Asano Kenkyusho, Nagoya, Japan

[21] Appl. No.: 290,340

[22] Filed: Dec. 27, 1988

[30] Foreign Application Priority Data

Jan. 21, 1988 [JP] Japan .................................. 63-11576

[51] Int. Cl.⁵ .......................... B26D 3/00; B26D 11/00
[52] U.S. Cl. ........................................ 83/152; 83/157;
    83/214; 83/215; 83/276; 83/563; 83/914;
    83/946
[58] Field of Search ................... 83/24, 422, 914, 437,
    83/452, 451, 39, 639, 640, 157, 694, 155, 151,
    214, 564, 155, 158, 622, 152, 215, 276, 563, 946

[56] References Cited

U.S. PATENT DOCUMENTS

| | | | |
|---|---|---|---|
| 3,461,761 | 8/1969 | Mojonnier | 83/567 |
| 3,968,714 | 7/1976 | Kuchyt | 83/640 X |
| 4,175,897 | 11/1979 | Kuchuk-Yatsenko et al. | 83/914 X |
| 4,419,913 | 12/1983 | Schutt et al. | 83/422 X |
| 4,434,691 | 3/1984 | LeBlond | 83/451 X |
| 4,583,436 | 4/1986 | Asano | 83/914 X |
| 4,633,745 | 1/1987 | Asano | 83/914 X |

Primary Examiner—Hien H. Phan
Attorney, Agent, or Firm—Sughrue, Mion, Zinn, Macpeak & Seas

[57] ABSTRACT

Apparatus and process for trimming articles molded on a plastic sheet and successively fed from a forming machine. A carriage receives the article to be held thereunder by vacuum and is moved in a trimming zone, where a pair of longitudinal cutter devices, each having a stationary blade and an angularly movable blade, are horizontally moved together from respective retreated positions for longitudinal cutting. Then, a front transverse cutter device having similar pair of blades is raised up from a retreated position for transverse cutting and then a rear transverse cutter device is similarly operated.

7 Claims, 10 Drawing Sheets

APPARATUS FOR TRIMMING ARTICLES MOLDINGLY FORMED ON THERMOPLASTIC SHEET AND PROCESS FOR OPERATING THEREOF

BACKGROUND OF THE INVENTION AND RELATED ART

The present invention relates to an apparatus for longitudinally and transversely trimming articles moldingly formed on a plastic sheet and a process for operating such apparatus. More particularly, it relates to the apparatus and the process for trimming the articles successively molded and supplied directly from a forming machine more efficiently and suitably for automatic operation thereof together with the forming machine.

Various articles such as bath tubs and refrigerator compartments are formed by feeding a thermally softened plastic sheet continuously or a length of such sheet intermittently between a pair of opposite dies separated with each other and then engaging said dies together, which may be subjected to raised or reduced pressure as the occasion demands.

There are inevitably formed unnecessary rectangular rims surrounding the article molded according to such forming method, which must be trimmed. Various apparatuses and processes have been proposed for such trimming.

For instance, U.S. Pat. No. 4,583,436 discloses an apparatus comprising a frame means disposed at a cutting station, first knife means mounted on said frame means for movement in a longitudinal direction, first drive means operably connected to said first knife means for driving said first knife means in said longitudinal direction, said first knife means comprising a plurality of first knife-support means each supporting a first cutting knife, said first knife means further comprising adjusting means for adjusting the transverse position of said first knife-support means, second knife means mounted for movement in a transverse direction, second drive means for driving said second knife means in said transverse direction to cut said plastic sheet in said transverse direction, said second knife means comprising a plurality of second knife-support means each supporting a second cutting knife, said second knife means further comprising second adjust means for adjusting the longitudinal position of said second knife support means, and actuating means for moving said second knife means between a severing position wherein said second knives engage said plastic sheet to cut the latter in said transverse direction as said second knife means are driven by said drive means and retracted position wherein said second knives are disengaged from said plastic sheet, whereby said first and second knife means are operable to cut said plastic sheet in both longitudinal and transverse directions to thereby cut out desired portions from said plastic sheet.

Such prior art has surely overcome the defects of the older trimming apparatus, which comprises a set of upper and lower frames, each comprising four blades so arranged as to correspond to the four lines of the plastic sheet to be severed so that longitudinal and transverse trimmings are made in one shot by relatively moving said set of frame blades in vertical direction to engage with each other. Every time when a size of the molded article is varied the set of trimming frame blades had to be exchanged which necessitated many sets of blades of various sizes to be stored, which was space and time consuming. Particularly when such trimming apparatus is combined with the forming machine, which is often combined with a extruder for forming a plastic sheet to be supplied to the forming machine, during exchange of the set of blades with another set of blades, all of the trimming apparatus, the forming machine and the extruder had to be stopped.

The prior art, however, is too complex in the construction and operation thereof to efficiently and automatically operate such apparatus combined with the forming machine. This is caused mainly by using the so-called pair or clamp chains for gripping the plastic sheet at the opposite side edges to be fed to the trimming apparatus from the forming machine which necessitates a complex construction and movement of the pair of cutting members. Although the related art used the pair of cutting members consisting of an elongated support member and a tip pointed knife to be moved along the length of said oppositely arranged support member in order to cut the unnecessary rim portions to be in a one piece like a picture frame so as to efficiently recover of the waste portion in addition to the purpose of avoiding time and labour consuming exchange of the cutter blades of the further older trimming apparatus, such complex apparatus can not be combined with the forming machine of which operation speed has been considerably increased and is not suitable for automatically operating.

SUMMARY OF THE INVENTION

An object of the invention is, thus, to provide an apparatus for trimming articles moldingly formed on a plastic sheet and a process for operating such apparatus without the defects referred to above.

Another object is to provide such apparatus and process enabling to trim the articles supplied successively from the forming machine at higher speed and to be automatically operated in combination with the forming machine.

DESCRIPTION OF THE PREFERRED EMBODIMENT

Figure 8:
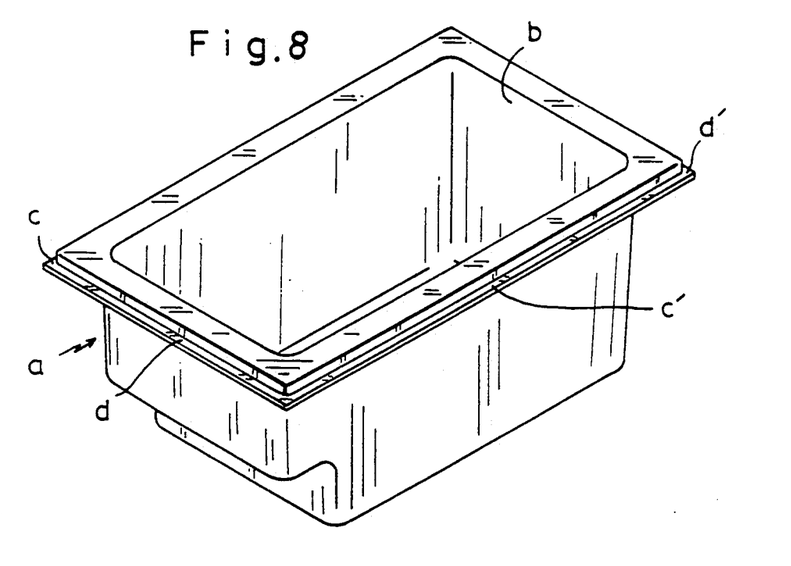
FIG. 8 is a perspective view of a molded bath tub having a rim to be cut off.

Firstly in reference to FIG. 8, the molded bath tub a has a cavity b defined by four side walls and a bottom wall, and is formed with outwardly protruded flanges from which side rims c, c' as well as front and rear rims d, d' are to be cut off.

Figure 1:
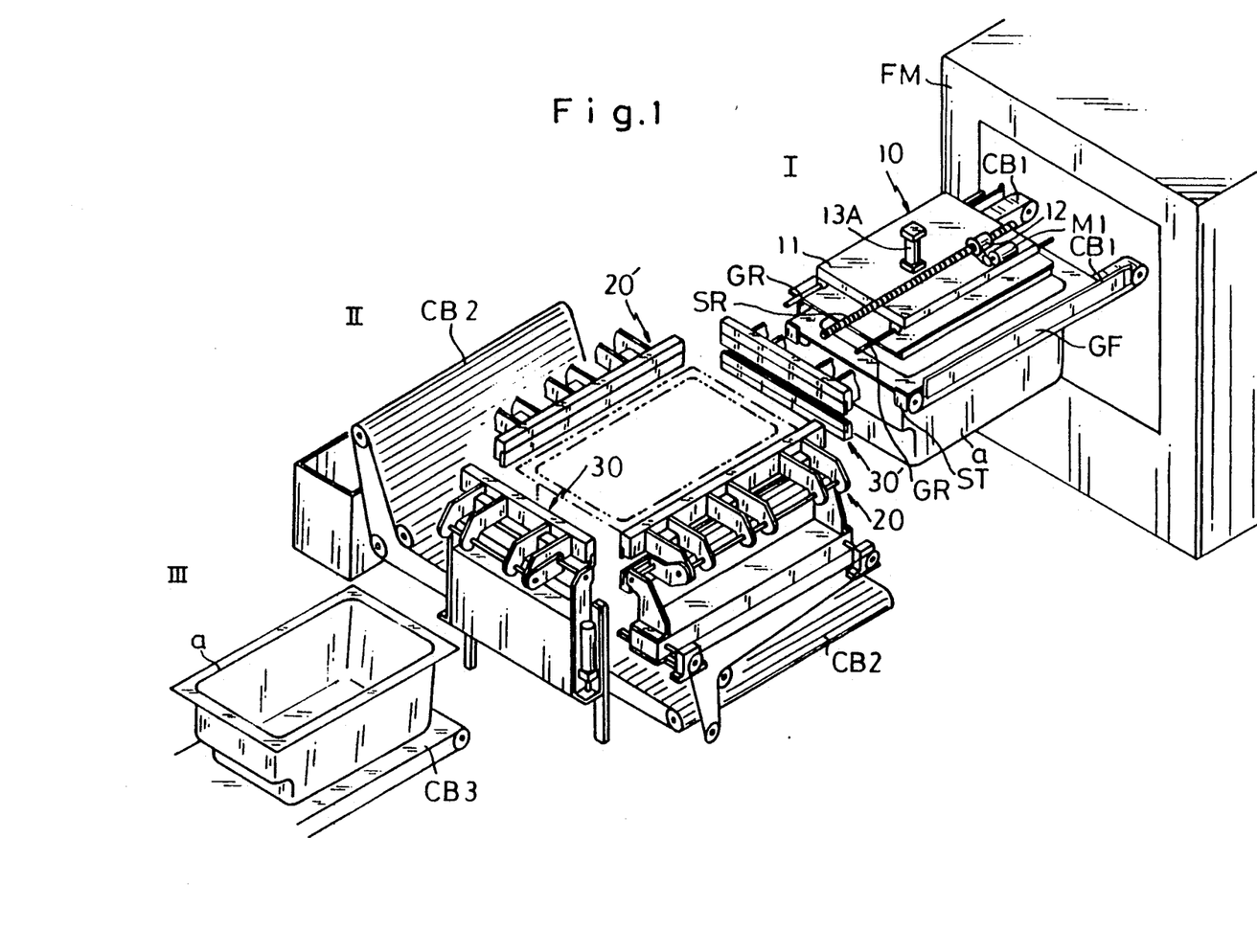
FIG. 1 is a schematic perspective view of the apparatus according to an embodiment of the invention together with a forming machine.

According to the process of the invention, said opposite side rims c, c' are firstly and concurrently cut off by the pair of longitudinal cutter devices 20, 20', and then the front rim d by the front cutter device 30 and finally the rear rim d' by the rear cutter device 30' as seen in FIG. 1.

Now in reference to FIG. 1, the molded article a such as the bath tub is exhausted out of a forming machine FM to be received by a carriage represented generally by 10 and now located in a supplying zone I. The carriage 10 has a top plate 11 on which a reversible servomotor M1 and a nut member 12 are mounted which is driven by the motor M1 and engages with a longitudinally extended screw rod SR so that the carriage 10 may move to bring the article a together therewith to a trimming zone II and to an exhausting zone III, and then return back to said zone I. It is preferable to provide a pair of guide rails GR extended in parallel to the screw rod SR for the carriage 10 to be stably movable along said zones I, II, and III.

In zone I, there are provided a pair of conveyor belts CB1 so as to support the article a exhausted out of the forming machine FM at the opposite side flanges (c, c') to be brought under the carriage 10. It is preferable to provide a pair of guide frames GF respectively extended along the conveyor belts CB1. When the article a held by the running belts CB1 abuts on a pair of stoppers ST, the conveyor belts CB1 are adapted to stop. Then, the article a is vacuum or suction held by the carriage 10 thereunder to be explained later in reference to FIGS. 2 and 3.

A trimming device in the zone II has a pair of longitudinal cutter devices 20, 20', each of which is adapted to be transversely movable between an outer waiting position where the article a and the carriage 10 holding said article are allowed to enter therebetween without colliding therewith and an inner position for processing with longitudinal trimming, which is explained later in reference to FIG. 4, as well as a pair of transverse cutter devices 30, 30', each of which is adapted to be vertically movable between a lower waiting position where the article a held by the carriage 10 is allowed to move thereabove without colliding therewith and an upper position for proceeding with transverse trimming, which is explained later in reference to FIG. 5.

There is provided a transversely extended conveyor belt CB2 under the casing bottom wall for the four cutter devices 20, 20', 30 and 30' for exhausting rims of the plastic sheet on which the article a is formed, cut off by said cutter devices and falling down thereon.

In the zone III, there is provided a further conveyor belt CB3 longitudinally extended so as to receive the article a from which unnecessary rims have been cut off and which is brought thereabove by the carriage 10 and falls down thereon to be exhausted out of the apparatus of the invention.

Figure 2:
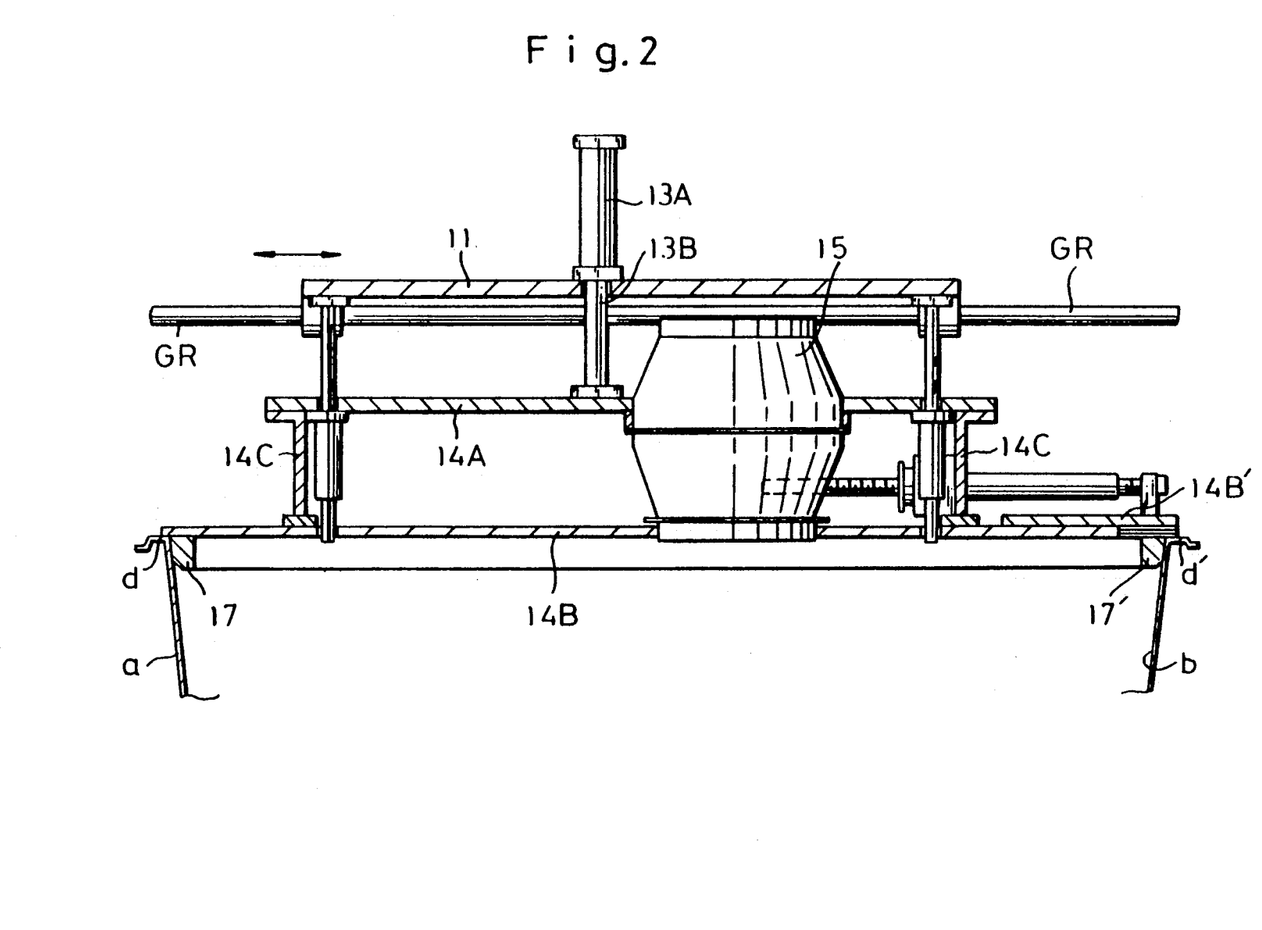
FIG. 2 is a side elevation partly in section of a carriage in the apparatus for receiving a molded article such as a bath tub from the forming machine in a supplying zone to bring it to be in a trimming machine and then an exhausting zone.
Figure 3:
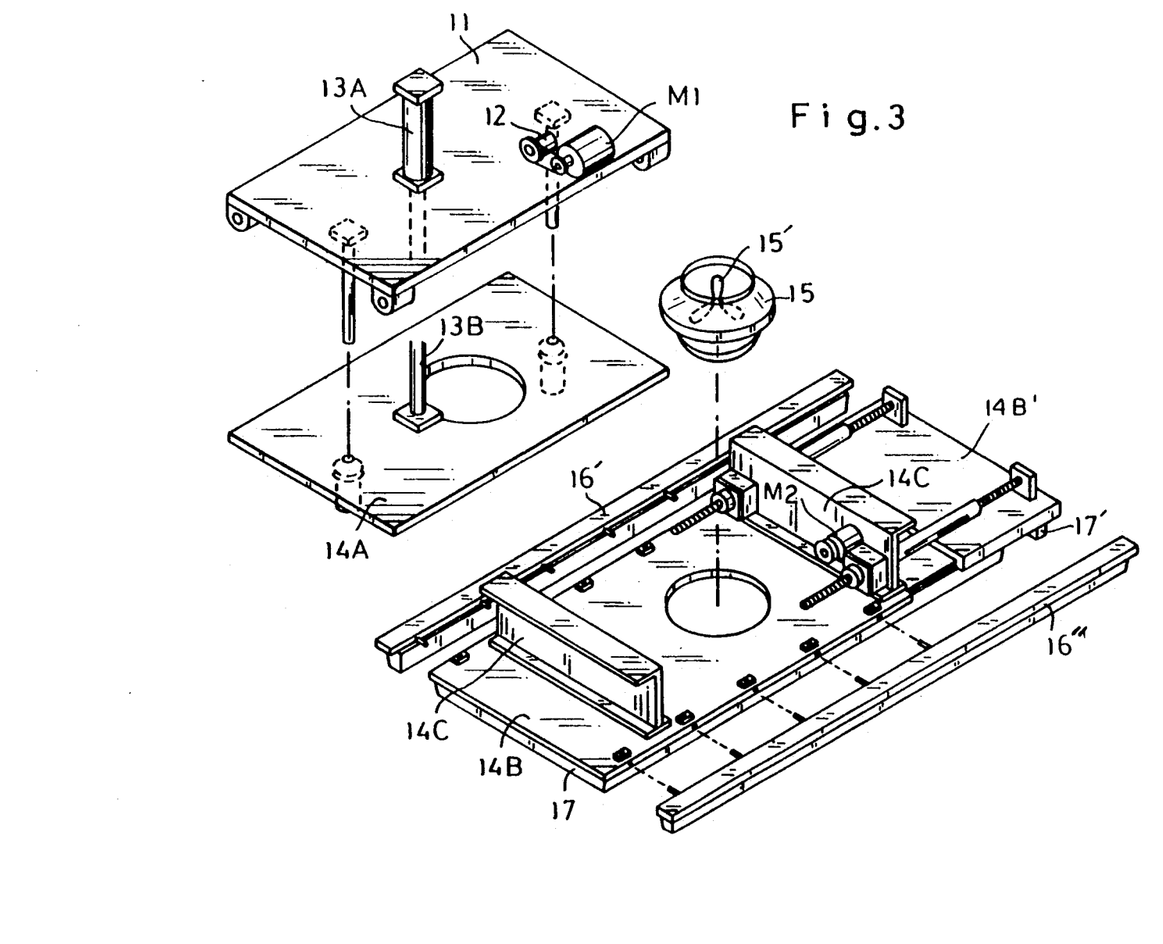
FIG. 3 is an exploded perspective view of said carriage.

In reference to FIGS. 2 and 3, the carriage top plate 11 engaging with said pair of guide rails GR so as to slidingly move therealong is further provided with a cylinder 13A of a hydraulic device fixed thereto, a piston 13B of which is fixed with an assembly at the free end thereof to be movable downwards and upwards. It is preferable to provide a pair of cylinder-piston guide members 14D for the assembly to smoothly move vertically.

The assembly comprises an upper plate member 14A, a lower plate member 14B and a pair of vertical members 14C respectively extending therebetween to form a frame. The plate members 14A and 14B are respectively formed with holes for supporting an air drum 15 therein which is open at upper and lower ends thereof and has a rotating fan 15' therein so as to generate a back pressure thereunder.

In order to suck the article a up according to back pressure, there are provided a pair of longitudinally extended side bars 16, 16' as well as front and rear transverse bars 17, 17' respectively fixed to the under surface of said lower plate member 14B so as to substantially air-tightly fit in the cavity b of the article a.

Since the size of the article a may vary, the distances between the pair of bars 16 and 16' as well as the pair of bars 17 and 17' are preferably made adjustable. For that purpose, one of said transverse bars, e.g. the rear bar 17' is fixedly mounted not on said plate member 14B but on a separate plate member 14B' which is slidingly movable relative thereto. The movable plate 14B' may be moved e.g. by a reversible motor M2 and a nut-screw rod device as shown in FIG. 3. For the same purpose, each of the longitudinal bars 16, 16' may be provided with a plurality of pins respectively projected transversely inwards so as to be fitted in a plurality of grooves correspondingly formed in the plate member 14B at the side surface thereof and respectively fixed e.g. by nut-screw means.

Figure 4:
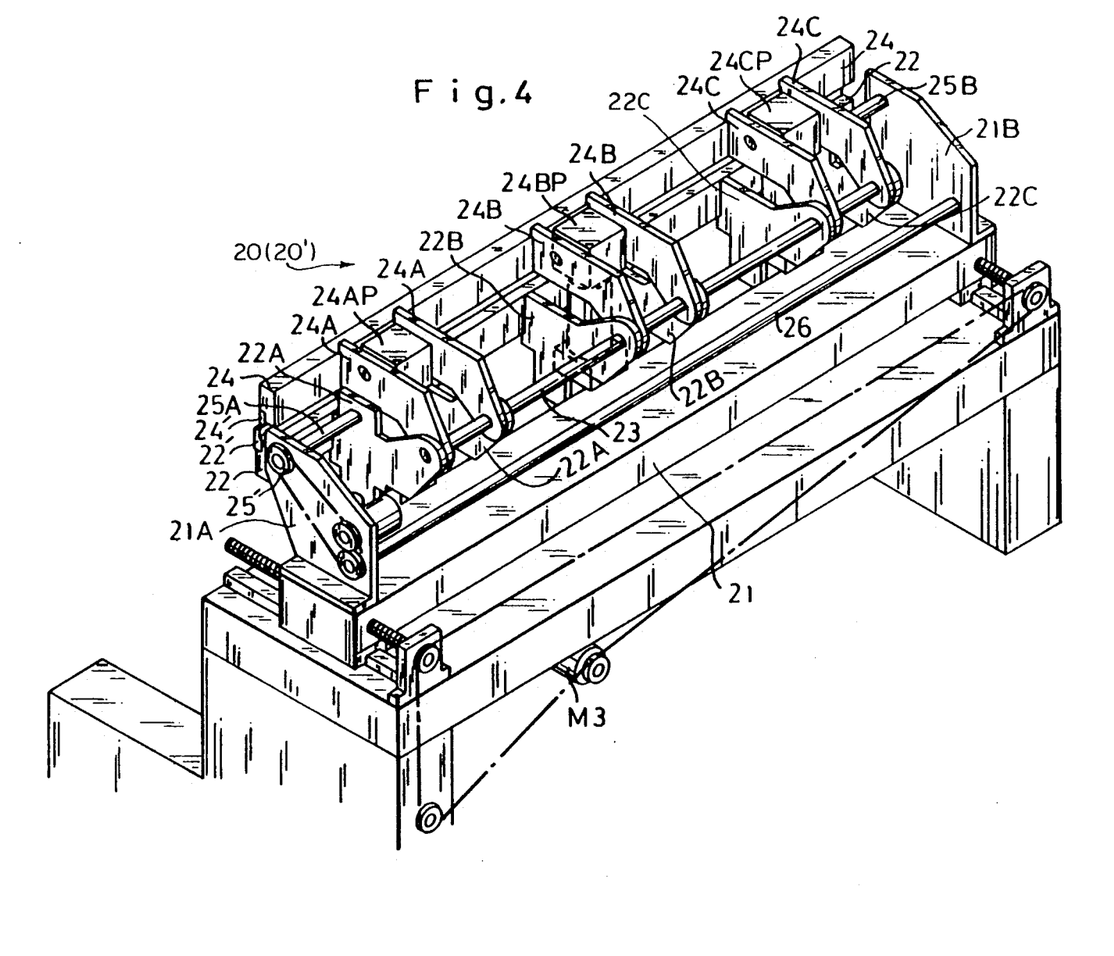
FIG. 4 is a perspective view of one of a pair of cutter devices for longitudinally trimming the molded article having an unnecessary rim surrounding said article.

In reference to FIG. 4, in which only one of said pairs of longitudinal cutter devices is illustrated since they are just same with each other in the construction and operation thereof, the cutter device 20 is slidingly movable in the transverse direction as a whole on the machine frame bed according to a reversible motor M3 through sprocket wheels one of which is mounted on the output shaft of said motor. An endless sprocket chain is extended around the sprocket wheels and a pair of screw rods are respectively extended in the transverse direction, each of the two of said wheels are fixedly mounted to be driven and a base plate 21 of said cutter device 20 is threadedly engaged for said transverse movement in either direction.

The base plate 21 is mounted with a pair of vertical end walls 21A, 21B, on either of which a reversible motor M4, a plurality of sprocket wheels one of which is fixedly mounted on the output shaft of the motor, and an endless sprocket chain extended therearound are provided.

There is provided a stationary cutter assembly comprising a cutter blade holder 22 longitudinally extended between said end walls 21A, 21B on the inner side of the cutter device, similarly extended cutter blade 22' which is fixed mounted thereon, and three pairs of arm levers 22A, 22B, 22C respectively fixed with said blade holder 22 at the respective inner side thereof. The arm levers 22A, 22B, 22C have a longitudinally extended pivot rod 23 piercing therethrough at the respective outer side.

There is similarly provided an angularly movable cutter assembly comprising a longitudinally extended cutter blade holder 24, a cutter blade 24' similarly extended and fixedly mounted thereon so as to oppositely face to the stationary blade 22' thereabove to be engaged therewith for cutting the longitudinal rim off from the plastic sheet on which the article a is formed. Three pairs of similar arm levers 24A, 24B, 24C are fixedly mounted on the side wall of said blade holder 24 at the respective inner side.

The arm levers 24A, 24B, 24C are mounted on the pivot rod 23 at the respective inner side thereof, so as to be angularly movable thereon relative to the stationary cutter assembly comprising the blade holder 22, the blade 22' and the arm levers 22A, 22B, 22C. Each pair of movable arm levers 24A (24B, 24C) have an enlarged head of a piston 24AP (24BP, 24CP) of a hydraulic device therebetween and fixed therewith. A cylinder 22AS (22BS, 22CS) of said hydraulic device is fixed with said stationary arm lever 22A (22B, 22C) so that when the hydraulic device in the waiting position (see the left in FIG. 6) is actuated to retract the piston, the movable blade 24' is engaged with the stationary blade 22' (see the right in FIG. 6) so as to trim the article a.

A larger assembly, which comprises the stationary cutter assembly (blade holder 22 blade 22', arm levers 22A, 22B, 22C, cylinders 22AS, 22BS, 22CS), said angularly movable cutter assembly (blade holder 24, blade 24', arm levers 24A, 24B, 24C, pistons 24AP (24BP, 24CP) and the pivot rod 23 on which said two assemblies are mounted so as to angularly movable with each other, is adapted to tilt as a whole relative to the base plate 21 and the opposite end walls 21A, 21B mounted thereon.

Figure 7:
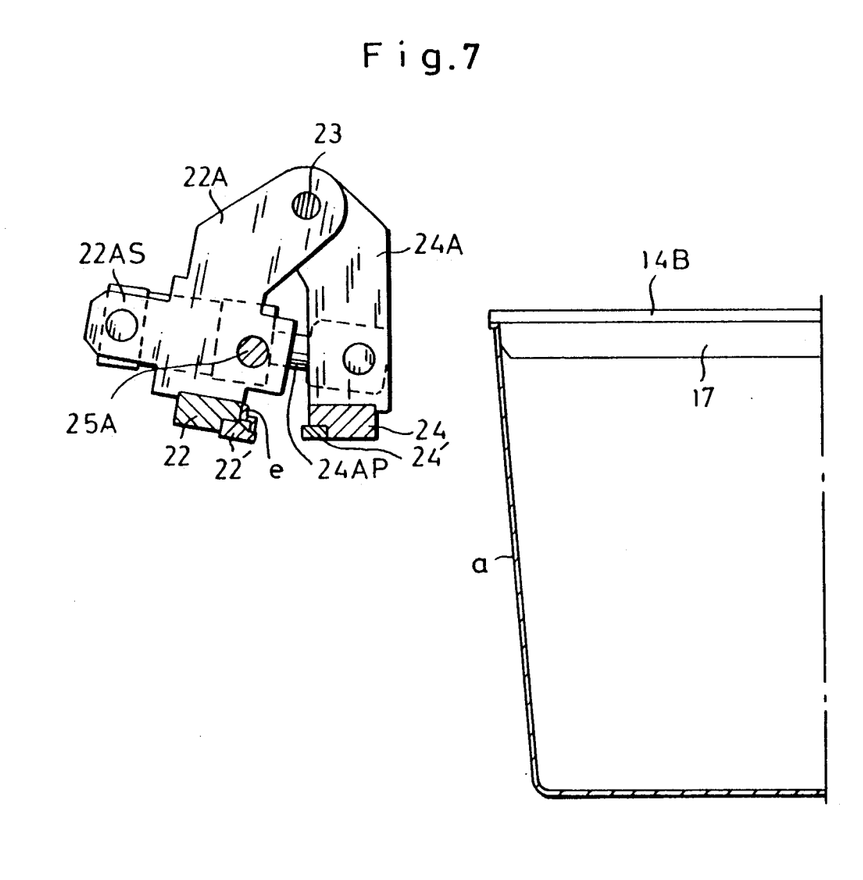
FIG. 7 is a side elevation partly in section of said cutter device shown in a tilted position so as to release a cut-off rim portion of the plastic sheet to fall down due to the gravity, together with the trimmed article.

For that purpose, a shaft 25A is fixed to the stationary arm lever 22A at one end, the other end of which is protruded out of the end wall 21A to be rotatable and mounted with one of the sprocket wheels 25 referred to above. Another shaft 25B is fixed to the stationary arm lever 22C at one end, the other end of which is rotatably held by the other end wall 21B and mounted with the similar sprocket wheel (not seen in FIG. 4) which is drivingly engaged with another sprocket wheel (also not seen), which is mounted on a shaft 26 longitudinally extended between the end walls 21A, 21B, the other end of which is mounted with another sprocket wheel. Thus, when the motor M4 referred to above is driven so as to rotate the sprocket wheel 25' in the counterclockwise direction, the shafts 25A, 25B held by the end walls 21A, 21B are correspondingly rotated so as to tilt said larger assembly by an angle of about 90° to be in a position shown at the left in FIG. 7 for releasing a cut rim e to fall down on the conveyor belt CB2 (FIG. 1) to be exhausted out of the apparatus.

The cutter device 20 or a further larger assembly comprising the base plate 21 and the opposite end walls 21A, 21B in addition to the larger assembly may be transversely moved, as a whole as referred to above, concurrently with the counter cutter device 20'.

Figure 5:
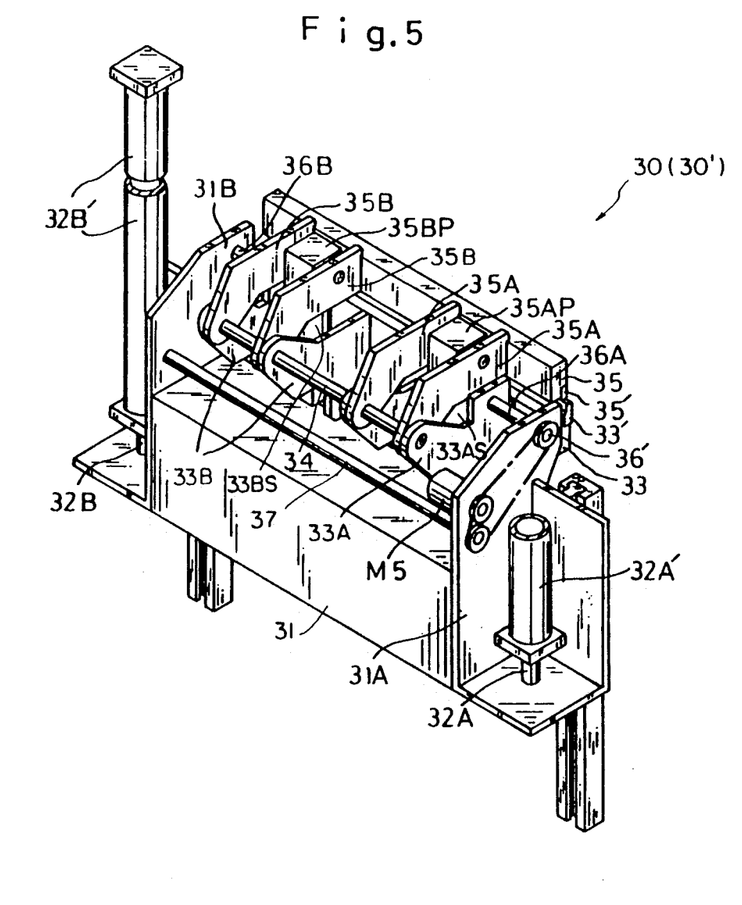
FIG. 5 is a similar view of one of a pair of cutter devices for transversely trimming said article.

The transversely extended cutter device 30 shown in FIG. 5 has a base member 31 and a pair of end walls 31A, 31B so as to form a frame, which is fixed to pistons 32A, 32B of a pair of hydraulic devices, of which cylinders 32A' 32B' are fixed to the machine frame so that the frame 31, 31A, 31B may be vertically raised up and lowered down by actuating said hydraulic devices.

There is provided a stationary cutter assembly comprising a cutter blade holder 33 transversely extended between said end walls 31A, 31B on the inner side of the cutter device, similarly extended cutter blade 33' which is mounted thereon, and two pairs of arm levers 33A, 33B respectively fixed with the blade holder 33 at the respective inner side thereof. The arm levers 33A, 33B have a transversely extended pivot rod 34 piercing therethrough at the respective outer side.

There is similarly provided an angularly movable cutter assembly comprising a transversely extended cutter blade holder 35, a cutter blade 35' similarly extended and fixedly mounted thereon so as to oppositely face to the stationary blade 33' thereabove to be engaged therewith for cutting the transverse rim off from the plastic sheet on which the article a is formed. Two pairs of similar arm levers 35A, 35B are fixedly mounted on the side wall of the blade holder 35 at the respective inner side.

The movable arm levers 35A, 35B are mounted on the pivot rod 34 so as to be angularly movable thereon relative to the stationary cutter assembly. Each pair of movable arm levers 35A (35B) have an enlarged had of a piston 35AP (35BP) of a hydraulic device therebetween and fixed therewith. A cylinder 33AS (33BS) of the hydraulic device is fixed with a stationary arm lever 33A (33B) so that when the hydraulic device is actuated to retract the piston, the movable blade 35' is engaged with the stationary blade 33' so as to trim the article a.

A larger assembly, which comprises said stationary cutter assembly (blade holder 33, blade 33', arm levers 33A, 33B, cylinder 33AS, 33BS) said angularly movable cutter assembly (blade holder 35, blade 35', arm levers 35A, 35B, pistons 35AP, 35BP) and the pivot rod 34 on which said two assemblies are mounted so as to angularly movable with each other, is adapted to tilt as a whole relative to the base member 31 and the opposite end walls 31A, 31B mounted thereon, similar to the longitudinal cutter device referred to above in reference to FIG. 4.

For that purpose, a shaft 36A is fixed to the stationary arm lever 33A at one end, the other end of which is protruded out of the end wall 31A to be rotatably and mounted with a sprocket wheel 36' which is rotated by a reversible motor M5 through sprocket wheels mounted on the output shaft of said motor and an endless sprocket chain extended therearound. Another shaft 36B is fixed to the stationary arm lever 33B, which is partly hidden by the neighbouring movable arm lever in FIG. 5, at one end. The other end of which is rotatably held by the opposite end wall 3B and mounted with a sprocket wheel (not seen in FIG. 5) which is drivingly engaged with another sprocket wheel (also not shown), which is mounted on a shaft 37 extended between the end walls 31A, 31B, the other end of which is mounted with another sprocket wheel driven by said motor M5. Thus, when the motor M5 is energized to rotate said sprocket wheel 36' in the clockwise direction, the shafts 36A, 36B held respectively by the end walls 31A, 31B are correspondingly rotated so as to tilt the larger assembly by an angle of abut 90° for releasing the cut rim to fall down on the conveyor belt CB2 similar to the longitudinal cutter device of FIG. 4.

Figure 6:
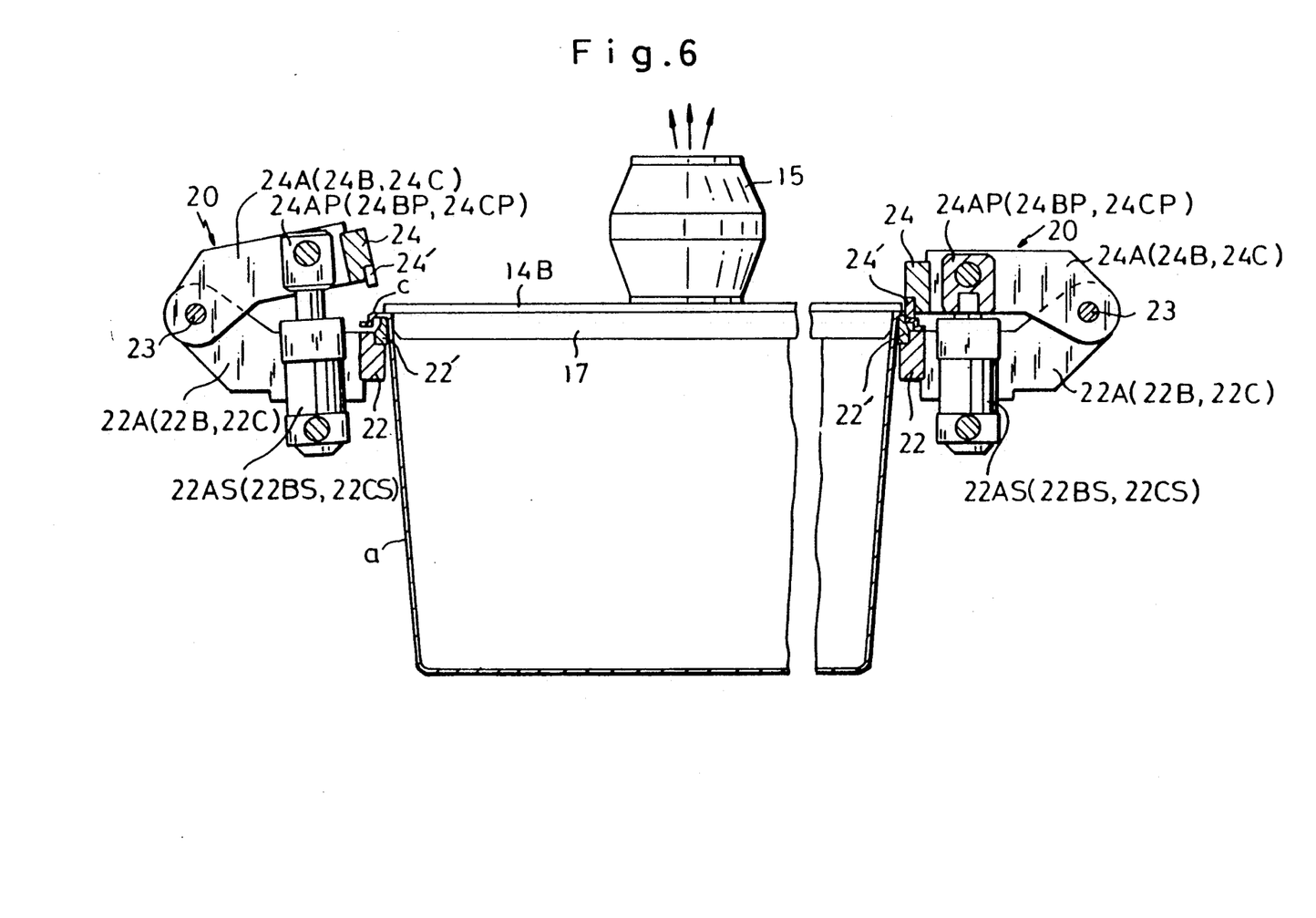
FIG. 6 is a side elevation partly in section of said pair of longitudinal cutter devices, each comprising a stationary cutter member, on which said article is supported at the longitudinally extending and transversely protruded flanges to be partly cut, and opposite cutter member pivoted thereon so as to angularly movable thereto and a hydraulic cylinder-piston device for moving the latter, in which the left cutter device is shown in a position before trimming operation while the right one in a position during or after the trimming operation.
Figure 9:
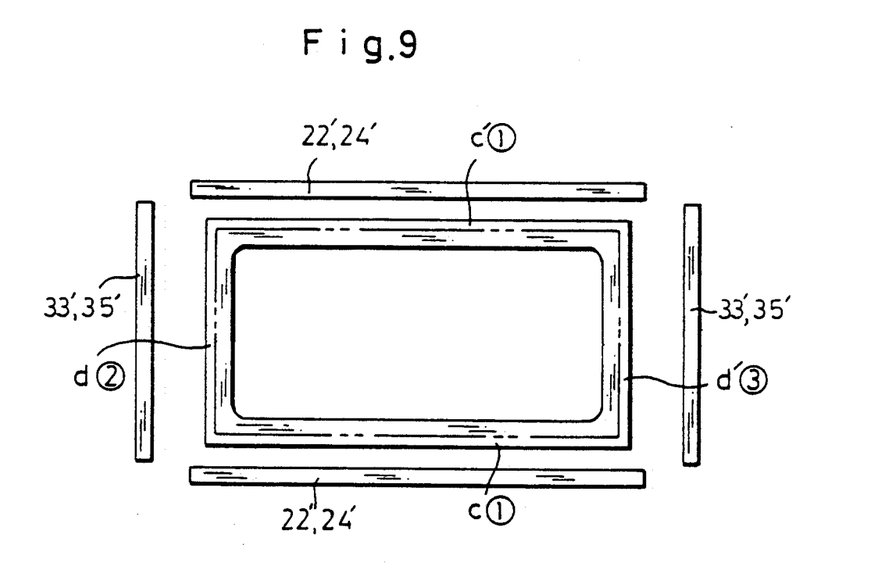
FIG. 9 is a top plan view of the molded bath tub and four cutter devices for showing the trimming cut.

Since the transverse cutter devices 30, 30' are on the way of the carriage 10 holding the article a thereunder moving from the zone I to the zone II, an then from said zone II to the zone III, they can not move on the level where cutting is made to be in the waiting or retreated position as the longitudinal cutter devices 20, 20'. Thus they are adapted to be lowered in the retreated position as explained above. Further, since the article a held by the carriage thereunder is brought in the trimming position by placing the outwardly protruded flange portion thereof on the stationary blade of the cutter device, the movable blade of which is moved up to open the mouth thereof as shown in FIG. 6 front and rear transverse trimming can not be concurrently done different from the left and right longitudinal trimming so that the front trimming is secondly made by the front transverse cutter device 30 and the rear trimming is finally made by the rear transverse cutter device 30' as referred to above and shown in FIG. 9.

Figure 10:
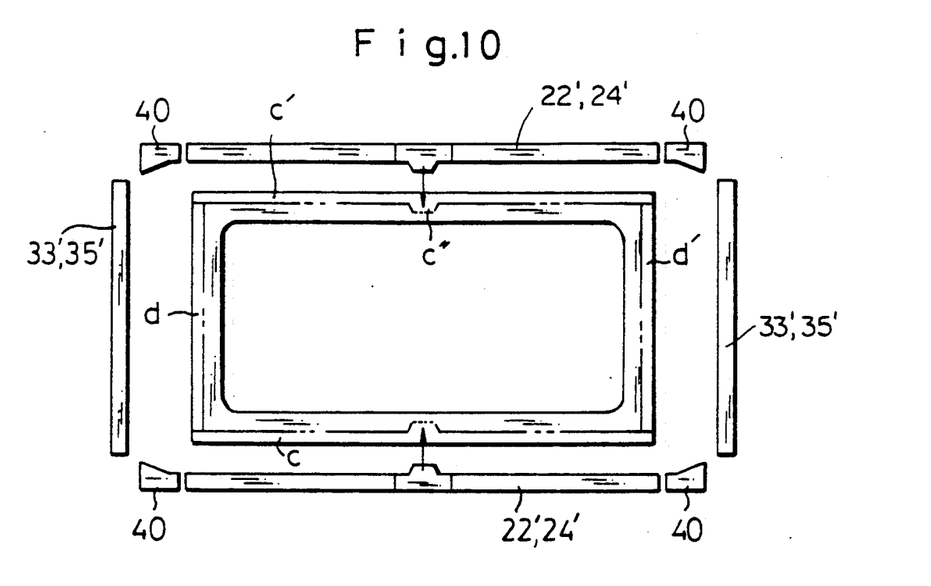
FIG. 10 is a top plan view of the molded bath tub having a rectangular rims to be cut off and further four corners to be chambered as well as each ones of the pairs of cutter devices.
Figure 11:
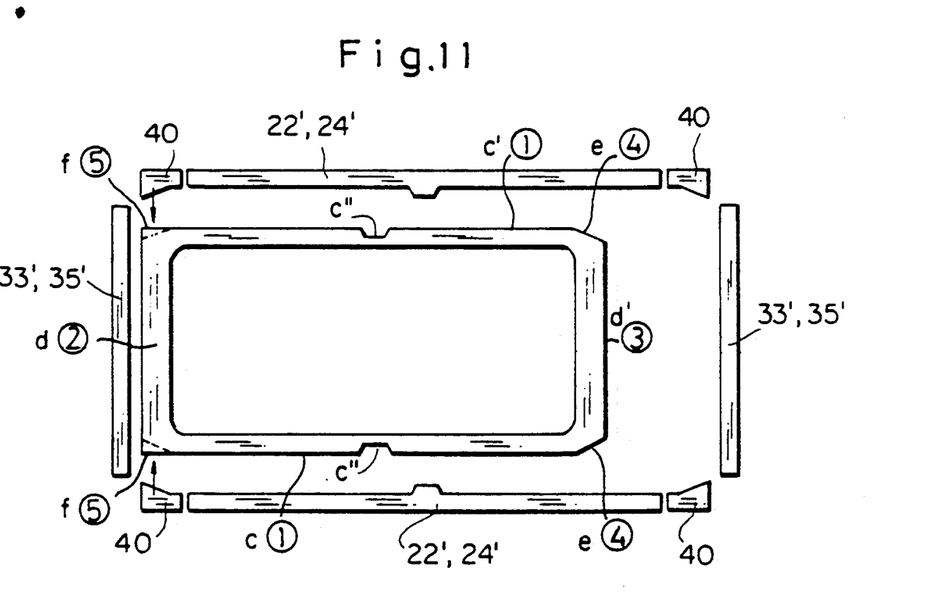
FIG. 11 is a similar view showing the order of trimmings according to the invention.

When it is necessary to make a particular longitudinal notch C or corner trimming e,f as shown in FIGS. 10 and 11, the longitudinal cutter blades 22', 24' must be replaced with correspondingly shaped ones and four pairs of blades 40 must be provided separate from the longitudinal cutter blades (22', 24'). The corner trimming is preferably made fourthly at the rear corners e after the third rear transverse trimming and then fifthly at the front corners. In FIG. 11 the circled members 1–5 indicate the order of sequential trimming operations.

Figure 12:
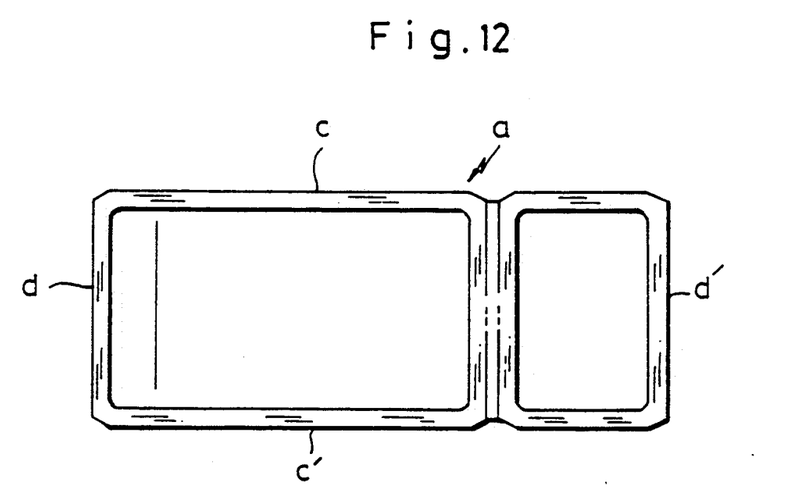
FIG. 12 is a similar view of the refrigerator compartments molded together on a plastic sheet and trimmed to be cut in two.
Figure 13:
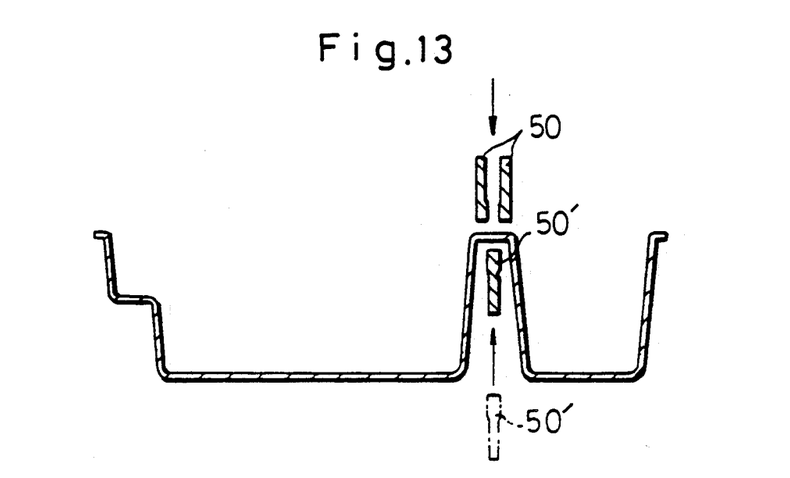
FIG. 13 is a section of the above and the cutters.

In reference to FIGS. 12 and 13, when the molded article a such as the linings for the smaller compartment for ice making or freezing and the larger compartment for cold storage of the refrigerator are formed together and must be separated, it is preferable to provide an upper blade 50 or pair of blades at the lower plate 14B of the carriage 10 to be vertically movable and a lower blade 50' in the zone II also to be vertically movable to separate the two portions by engaging said upper and lower blades 50, 50'.

Now in operation of the apparatus according to one of preferred embodiments of the invention, when the molded article a has been formed in the machine FM to be exhausted therefrom, the pair of conveyor belts CB1 are actuated to run so as to convey the article a with holding transversely outwards protruded flange portions thereof just below the carriage 10 now located in the zone I. When the article a abuts on the stopper ST at the front wall thereof, the conveyor belts CB1 are adapted to stop and the piston 13B of the hydraulic device is adapted to move downwards so that the two pairs of bars 16, 16', 17, 17' mounted under the sucking frame 14A, 14B, 14C of the carriage fit in the article cavity b and concurrently the fan 15' in the wind drum 15 is driven to rotate so that the article a is vacuum held by the carriage thereunder.

Concurrently the motor M1 is designed to be driven in one direction so that the carriage 10 moves together with the article a towards the zone II owing to thread engagement of the nut member 12 with the longitudinally extended screw rod SR. When the article a held by the carriage 10 arrives at the correct position in the zone II where the cutter device 20, 20', 30, 30' are in the respective retreated positions, the motor M1 is adapted to stop and the motor M3 is driven to transversely move the longitudinal cutter devices 20, 20' towards the article a so that the concerned stationary blade 22' is positioned relative to the outwardly protruded flange portion c of the article a (see the left in FIG. 6), for which the motor M4 is actuated so as to tilt the cutter assembly comprising the stationary blade 22' a little.

Then, the pistons 24AP, 24BP, 24CP are retracted in the respective cylinders so as to proceed with longitudinal trimming of the article at the both sides. After which the motor M3 is adapted to drive in the other direction to move the both cutter devices 20, 20' apart from the article. Then or during which the motor M4 is energized to tilt the cutter assembly by an angle of about 90° to be in the position shown in FIG. 7 for releasing the cut off rim e to fall down when actuating the pistons 24AP, 24BP, 24CP to protrude more.

During the cut rim release, the front transverse cutter device 30 is moved upwards by protruding pistons 32A, 32B more out of the concerned cylinders while keeping the movable blade 35' disengaged from the stationary blade 33' to be in the level for trimming, and then the carriage 10 is moved a little forward so that the forwardly protruded flange portion d of the article is inserted in the open mouth formed between the blades 33' and 35', after which the motor M5 is driven a little so that said article flange d is placed on the stationary blade 33'. The pistons 35AP, 35BP are retracted in the respective cylinders so that the rim d is cut from the article similar by the cutters to the above.

Then the carriage 10 is moved back a little so that the rear rim d' of the article a held thereunder is inserted in the transverse cutter device 30' having been raised up from its retreated position and consequent operations are carried out as referred to above.

Immediately after cutting of the rims d, d', the transverse cutter devices 30, 30' are retreated in the lower position and cut rim release is made by driving the motor M5 to rotate the shafts 36A, 36B for tilting the stationary and movable cutter assembly similar to the above.

During the cut rim release, the carriage 10 is moved to be in the zone III where the fan 15' is stopped so that the trimmed article a falls down owing to the gravity on the belt CB3. Immediately thereafter the motor M1 is energized to rotate the nut member 12 in the other direction so that the carriaged is returned to the initial position in the zone I for repeating the above operations.

The above is only an example of the preferred embodiments of the invention so that the invention should not be limited thereto. Various modifications can be made readily by those skilled in the art within the scope of the invention. For instance, the wind drum provided with the fan may be replaced e.g. with a vacuum pump. The sprocket wheels-sprocket chain may be replaced e.g. with pulleys-belt or string, gearings etc. The number of arm lever pairs in the cutter device is not critical. For instance, three, four or five pairs may be used instead of two or three pairs in the illustrated embodiment. Furthermore one or two pairs may be used instead of two or three pairs so far as power of the hydraulic or pneumatic cylinder-piston device is sufficient for cutting and any suitable means is provided for stable movement and balanced power along the length thereof.

As for automatically and sequentially actuating and disactuating concerned of motor means and hydraulic means, various designs are obvious to those skilled in the art, and since such is out of the scope of the invention, there will be no need for further explanation thereof.

What is claimed is:

1. Apparatus for trimming articles moldingly formed on a plastic sheet, which comprises, a carriage having means for suckingly holding the molded article thereunder and means for reciprocally longitudinally moving the carriage through the apparatus, a first zone having conveyor means for receiving said article from a forming machine to be brought under said carriage for suckingly holding, a second zone downstream of said first zone having a pair of first cutter assemblies each comprising a longitudinal cutter device mounted on a base member; a pair of second cutter assemblies each comprising a transverse cutter device mounted on another base member; means for actuating said pair of first cutter assemblies to transversely move between an inner position for trimming and a normal outer retreated position; means for actuating said pair of second cutter assemblies to vertically move between an upper position for trimming and a normal lower retreated position, so that when said first and second cutter assemblies are in the respective retreated positions the molded article is brought by said carriage in said second zone, and then said molded article is sequentially trimmed by said longitudinal and transverse cutter devices which are moved into respective trimming positions by a respective actuating means; means for tilting said longitudinal and transverse cutter devices respectively by an angle of about 90° relative to the respective base members so as to release respectively trimmed longitudinal plastic sheet portions to fall down; and conveyor means transversely extended thereunder to remove the trimmed sheet portions thereon out of the apparatus, and a third zone downstream of said second zone to remove the trimmed molded article which is brought thereto by and released to fall from the carriage out of the apparatus.

2. Apparatus as set forth in claim 1, in which said means for reciprocally moving said carriage comprises a screw rod mounted on a machine frame to be longitudinally extended through said three zones as well as a reversible motor and a nut member driven thereby for rotation, which are mounted on said carriage so that nut member threadedly engage with said screw rod.

3. Apparatus as set forth in claim 2, in which said suckingly holding means comprises a top plate member, a lower frame member and a cylinder-piston device connecting said two members together so that the latter member may be lowered and raised relative to the former, said frame member being adapted to snugly fit in the molded article and provided with sucking means so that when lowering said frame member to fit in the molded article and actuating said sucking means the article is held by the carriage and when disactuating said sucking means the article is released therefrom to fall.

4. Apparatus as set forth in claim 1, in which said transverse cutter device comprises a pair of elongated cutter members, each having a plurality of lever arms fixed thereto; an elongated pivot rod extending through said lever arms in parallel to said pair of elongated cutter members so that one set of said elongated cutter members and arm levers is angularly movable relative to the other set which is stationary and held by an elongated base member between opposite end walls thereof; and a cylinder-piston device connecting said two sets so that when actuating said device said angularly movable set normally in the disengaged position may be engaged with said other set for trimming.

5. Apparatus as set forth in claim 1, in which said means for actuating said first cutter assembly to transversely move between an inner position and a normal outer position comprises a reversible motor mounted on a machine frame and a nut and screw device either of which is mounted on said first cutter assembly while the other component is adapted to be driven by said motor so that when motor is energized to rotate in either direction said first cutter assembly may be slidingly moved on the machine frame to be in either of two positions.

6. Apparatus as set forth in claim 1, in which said means for actuating said second pair of cutter assemblies to vertically move between an upper position and a lower position comprises a cylinder and piston device one component of which mounted on the second cutter assembly while the other component is mounted on a machine frame so that when said device is actuated said assembly may vertically move relative to said machine frame.

7. Apparatus as set forth in claim 4, in which said means for tilting said transverse cutter device relative to the base member comprises a reversible motor and a pair of shafts each having one end fixed to the outermost stationary arm lever while the other end of said shaft is held by said end wall concerned for rotation so that when said motor is driven in either direction shafts may be rotated and consequently said stationary and angularly movable cutter members are tilted as a whole for releasing the trimmed plastic sheet portions to fall down.

* * * * *